UNITED STATES PATENT OFFICE.

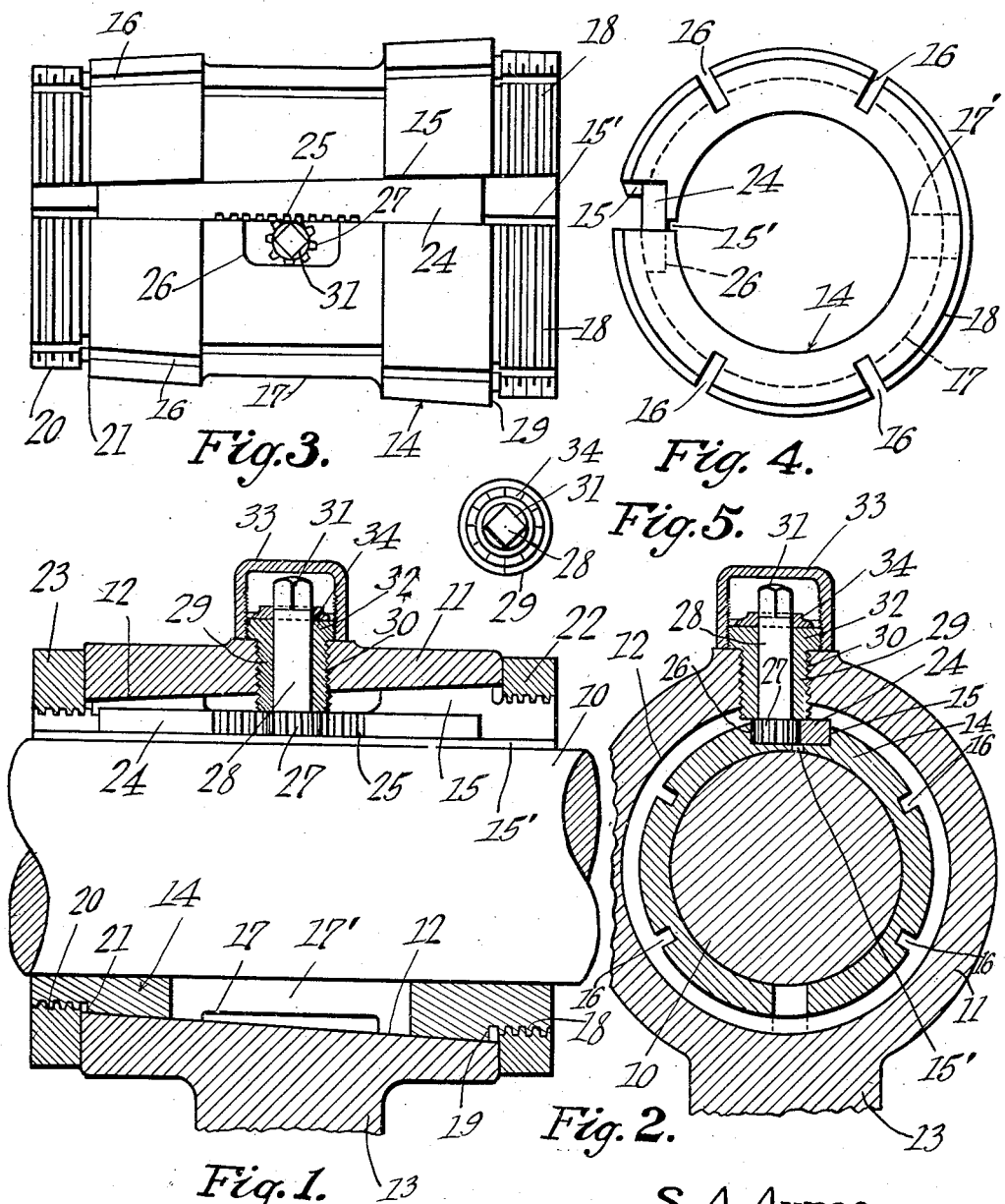

SEYMOUR A. AYRES, OF EAST LANSING, MICHIGAN.

ADJUSTABLE JOURNAL-BOX.

1,340,102. Specification of Letters Patent. Patented May 11, 1920.

Application filed December 8, 1919. Serial No. 343,232.

*To all whom it may concern:*

Be it known that I, SEYMOUR A. AYRES, a citizen of the United States, residing at East Lansing, in the county of Ingham and State of Michigan, have invented a new and useful Adjustable Journal-Box, of which the following is a specification.

This invention relates to journal boxes or bearings and more particularly to an adjustable bearing box or journal, particularly adapted for heavy duty or service, and the primary object of the invention is to provide improved means for expanding split journaled boxes or bearings in grinder spindle bearings and other shaft bearings where close adjustment is required.

A further object of the invention is to provide improved adjustment means by which the bearing can be adjusted for looseness or tightness, to permit the journal or bearing to be tightened in the housing without tightening the same on the spindle to too excessive a degree, or in such a manner as to bind thereon, while also providing means by which the degree of adjustment can be registered so as to indicate the exact degree of adjustment in order that accurate adjustment may be obtained.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 is a vertical sectional view showing a spindle mounted in a housing provided with the improved journal box or bearing;

Fig. 2 is a vertical sectional view at right angles to Fig. 1 through the adjusting means;

Fig. 3 is a plan view of the journal box detached from the housing;

Fig. 4 is an end view of the journal box as shown in Fig. 2;

Fig. 5 is a detail face view of the sleeve carrying the operating shaft.

Referring to the drawings in detail, in which like reference characters designate corresponding parts throughout the several views, 10 designates a spindle or shaft journaled in a housing 11 having a tapered bore 12 forming a bearing, the housing being suitably supported by the frame member 13. The journal box or bearing proper is indicated at 14, and is received within the housing 11 so as to rotatably receive the spindle or shaft 10 therethrough, the journal box being tapered to fit the bore of the housing 11 and having a bore of even diameter throughout its length to directly receive the spindle or shaft for rotation.

As indicated in the drawings, the journal box is provided with a tapered slot and recess 15 extending longitudinally thereof throughout its length, one wall of the slot extending axially of the sleeve forming the journal box or bearing, and the other wall extending at an acute angle with respect thereto or being beveled, so as to provide the required taper. The journal box is also provided with a series of radially extending longitudinal grooves 16, a reduced intermediate portion 17, a reduced externally threaded portion 18 at its enlarged end forming a shoulder 19, and a reduced externally threaded portion 20 at the reduced end thereof, forming a shoulder 21, both of said shoulders being located normally within the ends of the housing 11 when the journal box or bearing is in position therein.

The circumscribing enlargements at either side of the reduced central portion or circumscribing recess 17 engage the inner wall of the housing 11, thus providing an annular space between the reduced portion 17 and said wall for a purpose to be hereinafter fully explained. The threaded portions 18 and 20 project beyond the ends of the housing 11, and have threaded thereon, collars 22 and 23 which are disposed in contact with the ends of the housing and serve to permit longitudinal adjustment of the bearing box or journal therein and to lock the same in adjusted position.

The journal box or bearing is thus in the form of a split sleeve, and received in the slot thereof, is a tapered key or spreader 24, the ends of which terminate at spaced distances from the threaded portions 18 and 20, and the axial edge of which is formed with a rack bar 25, the rack teeth of which extend a short distance of the intermediate portion of the spreader. Adjacent to the rack teeth, the split journal box is provided in one edge with a recess 26 intermediately of the reduced portion 17 so as to accommodate a pinion 27 fixed to the inner end of a radial shaft 28 so that the teeth of the pinion will mesh with the rack teeth. The radial shaft is disposed to rotate in a radial sleeve 29 having threaded engagement with an internally threaded aperture in the housing as shown at 30 and so that the inner end thereof can be adjusted to contact with the spreader and retain the latter in position and also retain the pinion in position to mesh therewith, adjustment being allowed as required. The shaft 28 projects outwardly beyond the sleeve 29, and is squared as shown at 31, for the application of a crank handle or wrench, so that the shaft may be turned for imparting longitudinal movement to the spreader for a purpose to be hereinafter more fully set forth. The outer end of the sleeve is enlarged as shown at 32 and externally threaded for engagement by an internally threaded cap nut 33, which serves to protect the parts including the projecting end of the shaft, as well as to prevent the entrance of dirt or other foreign matter.

Mounted on the projecting circular portion of the shaft is a graduated collar 34 which provides a micrometer adjustment so that the exact degree of rotation imparted to the shaft can be ascertained, and thus the degree of movement imparted to the spreader through the rack and pinion will be registered or indicated on the graduated collar whereby the adjustment can be very accurately made to acquire the necessary close adjustment which must be accomplished in bearings of this type. While I have illustrated a particular embodiment of adjusting means for spreading or permitting the split journal box or bearing contact, employing a rack and pinion, I desire to have it understood that other and positive means may be employed for this purpose and particularly and especially for shifting the spreader longitudinally for obtaining the required adjustment as to tightness or looseness of the journal box or bearing within the housing and the required fit of the bearing with respect to the spindle or shaft 10. It is also to be understood that the journal box or bearing is of the proper Babbitt metal, bronze or the like, so as to permit free rotation of the shaft or spindle without unduly wearing the same.

In adjusting the bearing, to take up wear between the parts, the pressure on the spreader by relieving the pressure on the journal box within the housing by loosening the collar 22, this being done by unscrewing the collar from abutting engagement with the adjacent end of the housing. The spreader is then shifted by the means described, by turning the shaft 28 after removing the cap 33, the exact degree of rotation being indicated by the graduated collar 34, and then by tightening the collar 23, against the adjacent end of the housing, the journal box or bearing will be held against further movement. Also, the spreader will be held from movement and the pinion mounted in the recess 26 will serve as a dowel to retain the parts in position. When the collar 22 is loosened, the collar 23 will serve to draw the journal box into the housing to allow for expansion or contraction of the journal and cause the latter to properly fit the spindle. The journal box is of course held from turning by the pinion and its operating shaft, mounted in the manner specified. It should also be noted that the spreader or tapered key is parallel with the inner face of the journal box or bearing, so that accurate adjustment due to the spreader or tapered key fitting the walls of the recess and slot properly, can be accomplished. Also, since the spreader is wholly contained in the journal box independently of the housing, the adjustment is not lost when the adjusting collars are released and the journal box disturbed in the housing, the journal box being held parallel in adjustment, either end receiving an equal expansion or contraction as the case may be and being capable of being drawn into the housing and more rigidly without tightening the spindle. Furthermore, the journal box can be better controlled after becoming heated and the bearing metal contracted as is the case in most heavy duty bearings.

The slot 15 is in the form of a recess in the outer face of the sleeve 14 and has a narrow portion 15 at the inside, while the reduced portion 17 is provided diametrically opposite to the recess or slot with a slot 17' extending longitudinally so as to accommodate and permit proper lubrication.

Having thus described the invention, what I claim is:

1. The combination with a journal box of split formation producing a tapered slot, a tapered key in said slot and serving as means of expanding the journal box or permitting the same to contract, and means for shifting said tapered key, said key being located in alinement with the inner face of the journal box, and means for indicating the degree of movement imparted to the tapered key.

2. In an adjustable journal box, the combination with a housing having a tapered bore and a bearing sleeve of tapered formation within said bore and provided with a tapered slot in its wall; of a tapered spreader in said slot, and means engaged through the housing and with the spreader, to move the latter in the slot, for spreading the bearing or to permit contraction thereof, said means serving to prevent turning of the bearing in the housing and comprising a shaft having geared connection with the spreader and a circular graduated washer plate coöperating with said shaft to indicate the degree of movement imparted to the spreader.

3. In an adjustable journal box, the combination with a housing having a tapered bore and a bearing sleeve of tapered formation within said bore and provided with a tapered slot in its wall; of a tapered spreader in said slot, a spindle in said bearing, means for holding the bearing against longitudinal movement, means engaged through the housing and bearings with the spreader for moving the latter and holding the same in an adjusted position and means coöperating with the last named means for obtaining a micrometer measurement of the degree of movement imparted to the expanding and contracting means.

4. In an adjustable journal box, the combination with a housing having a tapered bore, and a bearing sleeve of tapered formation within said bore and provided with a tapered slot in its wall; of a tapered spreader in said slot, a spindle in said bearing, means for holding the bearing against longitudinal movement, and means engaged through the housing and bearing and with the spreader, said spreader being formed with rack teeth in one side thereof, said bearing being provided with a recess adjacent to said rack teeth, a shaft rotatably mounted radially of the housing and carrying a pinion in mesh with said rack teeth, said shaft having means of being rotated, and means coöperating with said shaft to indicate the degree of movement imparted thereto and to the spreader.

5. In an adjustable bearing of the class described, a frame having a housing provided with a tapered bore, a tapered split sleeve mounted in said bore and adapted to receive a shaft for rotation therein, said sleeve having threaded end portions, collars threaded on said ends and designed to contact with the ends of the housing, said collars serving to permit adjustment of the sleeve in the housing, said sleeve having a reduced central portion providing a space between the peripheral wall thereof and the interior wall of the housing, and the spreader movable in the split of the sleeve to expand the same.

6. In an adjustable bearing of the class described, a frame having a housing provided with a tapered bore, a tapered split sleeve mounted in said bore and adapted to receive a shaft for rotation therein, said sleeve having threaded end portions, collars threaded on said ends and designed to contact with the end of the housing, said collars serving to permit adjustment of the sleeve in the housing, said sleeve having a reduced central portion providing a space between the peripheral wall thereof and the interior wall of the housing, a spreader between the split portions of the sleeve, said sleeve being formed with a recess at the split, said spreader being provided with rack teeth at one side, a radial sleeve mounted in the housing, a shaft rotatable therein, the pinion at the inner end of the shaft in mesh with said rack teeth of the spreader, said shaft having a projecting end by which it may be turned, a graduated collar around the outer end of the shaft and adapted to register the degree of rotation imparted thereto, and a cap mounted on the sleeve over the shaft end.

In testimony that I claim the foregoing as my own, I have hereto affixed my signature in the presence of two witnesses.

SEYMOUR A. AYRES.

Witnesses:
   CHAS. W. FOSTER,
   WM. S. CAMERON.